July 18, 1950 W. R. BLISS 2,515,187

WIDE DYNAMIC RANGE AMPLIFYING AND DEMODULATING SYSTEM

Filed April 9, 1942

Inventor

William R. Bliss

By [signature]

Attorney

Patented July 18, 1950 2,515,187

UNITED STATES PATENT OFFICE 2,515,187

WIDE DYNAMIC RANGE AMPLIFYING AND DEMODULATING SYSTEM

William R. Bliss, Washington, D. C.

Application April 9, 1942, Serial No. 438,320

8 Claims. (Cl. 250—20)

(Granted under the act of March 3, 1883, as amended April 30, 1928; 370 O. G. 757)

This invention relates to an amplifying and demodulating system for use in radio reception and capable of functioning over a wide dynamic range without blocking. Whenever used herein, the terms dynamic range and dynamic level refer respectively to range and level of signal strength.

The invention finds particular application to radio echo distance finding systems as a means for preventing the jamming of receivers by the use of CW signals.

It is an object of this invention to provide an amplifying and demodulating system for use in radio reception which will give unimpaired response and substantially uniform gain over a wide dynamic range of signal reception.

It is another object of this invention to provide a system as indicated above which will, upon the blocking of the normal amplifying channel, make available an alternative path of the same nature which is normally unresponsive.

Figure 1:
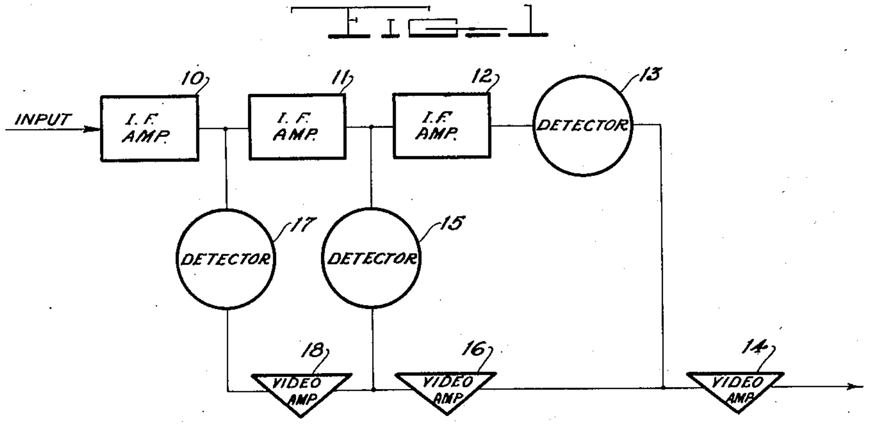
Figure 2:
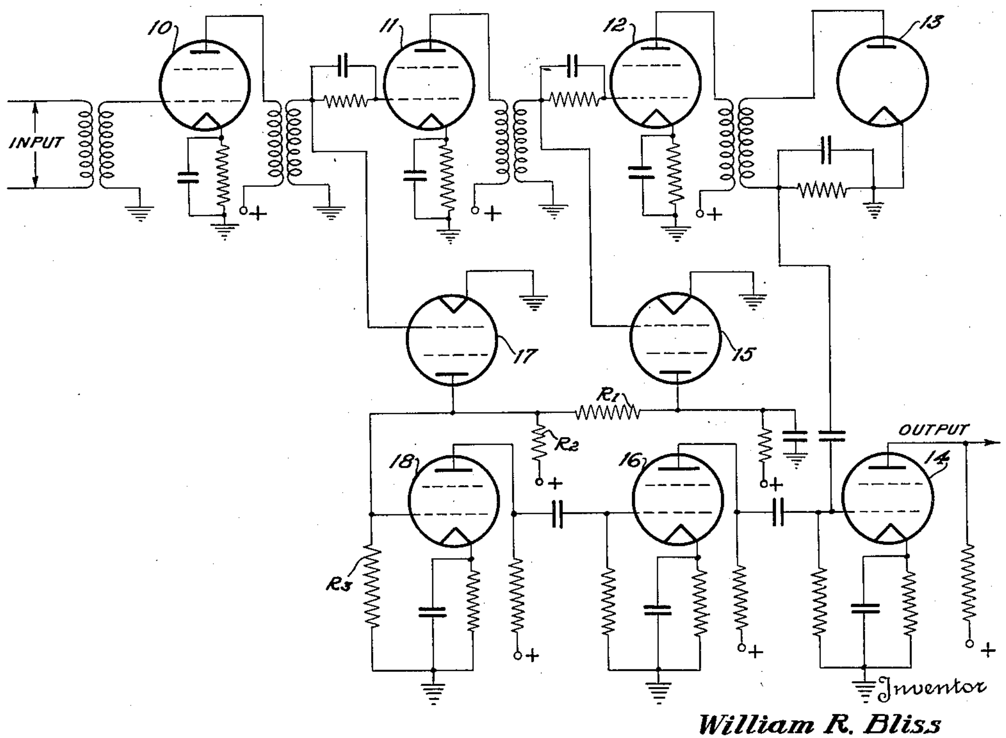

It is a further object of this invention to provide an amplifying and demodulating system having a series of amplifying and demodulating channels each originating ahead of a different amplification stage of the normal amplifying and demodulating channel and each becoming responsive only upon the reception of a signal of sufficient amplitude to block the normal amplifying stage immediately following it. Other objects will become apparent from a careful consideration of the following description when taken together with the accompanying drawing, in which:

Fig. 1 is a block diagram of an amplifying and demodulating system embodying the invention, and Fig. 2 is a schematic circuit diagram of a slightly modified version of the system illustrated in Fig. 1.

Referring now to Fig. 1 there is shown an amplifying and demodulating system comprising three stages of I. F. amplification designated by the reference characters 10, 11 and 12 followed by the detector 13 and a stage 14 of video or audio amplification. Shunted around the last I. F. stage 12 and detector 13 is a detector 15 and a stage 16 of video or audio amplification. Shunted around the last two stages of I. F. amplification 11 and 12 and the detector 13 is a detector 17 and the stages 18 and 16 of video or audio amplification. The gain of each of the three stages of the I. F. amplification and the video amplifiers 16 and 18 is preferably equal. The lower end of the efficient operating range of each of the detectors 15 and 17 is selected to lie at substantially the same dynamic level which will cause blocking of the stage of I. F. amplification immediately following the point at which the detector is connected into the I. F. amplifying system.

In order to facilitate the matching of the gain of the substituted video amplification with that of the corresponding I. F. stages, the detector 15 is shown in Fig. 2 connected ahead of the amplifiers 16 and 18 through an attenuator composed of the resistances $R_1$ and $R_2$ and $R_3$, which constitute a potentiometer. Matching of gain may be accomplished by adjusting the value of $R_1$. Fig. 2 otherwise is a schematic circuit diagram of the systems shown in Fig. 1 and is composed of conventional elements, the description of which is not necessary.

The operation of the device is as follows:

During the reception of signals of normal strength each of the detectors 15 and 17 has applied to it an input of such low value as to be below its efficient operating range. If now a signal be received at such a dynamic level as to block the I. F. amplifier 12 the input to detector 15 will lie within its operating range and the tube will commence to function in an efficient manner. The stage 16 of video amplification will replace the stage 12 of I. F. amplification which has been rendered inoperative. If the dynamic level of the signal is raised sufficiently so as also to block stage 11 of I. F. amplification the detector 17 will commence to function and the stage 18 of video amplification will replace stage 11. Thus the gain is kept constant but the dynamic range is greatly increased. Use of the attenuator shown in Fig. 2 will also operate to maintain constant the gain of the system regardless of whether one or two stages of I. F. amplification have been blocked.

The invention described herein may be manufactured and used by or for the Government of the United States of America for governmental purposes without the payment of any royalties thereon or therefor.

I claim:

1. An amplifying and demodulating system comprising a main channel, said main channel comprising at least one amplifying stage followed by a demodulator, and a branch channel shunted around said amplifying stage and said demodulator and returning to said main channel, said branch channel comprising a demodulator followed by at least one amplifying stage, the lower limit of the operating range of the demodulator of said branch channel beginning at substantially the dynamic level at which the amplifying stage of said main channel blocks.

2. An amplifying and demodulating system comprising a main channel, said main channel comprising at least one amplifying stage followed by a demodulator, and a branch channel shunted around said amplifying stage and said demodulator and returning to said main channel, said branch channel comprising a demodulator followed by at least one amplifying stage, the gain of said amplifying stages being substantially equal.

3. An amplifying and demodulating system comprising a main channel, said main channel comprising a plurality of cascaded amplifying stages followed by a demodulator, a plurality of branch circuits, each connected ahead of one of said amplifying stages and by-passing said demodulator and all of said amplifying stages following its point of connection, each of said branches comprising a demodulator followed by sufficient stages of amplification to match in gain the amplification stages bypassed by said branch.

4. An amplifying and demodulating system comprising a main channel, said main channel comprising a plurality of cascaded amplifying stages followed by a demodulator, a second channel shunted around at least one of said amplifying stages and said demodulator, said second channel comprising a demodulator followed by at least one amplifying stage, the lower limit of the operating range of the demodulator in said second channel lying substantially at the dynamic level at which occurs blocking of the main channel amplifying stage next following the point of attachment of said second channel.

5. A demodulation system comprising a main demodulation channel, said main channel comprising a plurality of amplification stages, a plurality of branch demodulation channels shunting said main channel, each of said branches originating ahead of a different one of said stages, and having a dynamic operating range the lower limit of which coincides with the upper limit of the dynamic operating range of the amplification stage next following its point of origin.

6. In combination, input means; a first rectifier fed by the input means; an amplifier fed by the input means; a second rectifier; means coupling the output of the amplifier to the second rectifier; attenuation means fed by the second rectifier; output means coupled to the first rectifier and the attenuation means; and means operative to apply a modulated alternating signal to the input means.

7. In combination, input means; means operative to apply to the input means a modulated alternating signal; a first signal channel fed by the input means comprising a rectifier; means operative to render the first signal channel responsive only to signals above a predetermined level of amplitude; a second signal channel fed by the input means comprising an amplifier, a second rectifier fed by the amplifier, and a linear attenuator fed by the second rectifier, the second signal channel being responsive only to signals below a predetermined level of amplitude; and output means operative to combine signals derived from the first signal channel and the second signal channel.

8. In combination, signal channel means for carrying signals of widely varying amplitudes, detector means operative to rectify low level signals responsive to the signal channel means, further detector means operative to rectify higher level signals responsive to the signal channel means, output channel means responsive to both said detector means, and attenuator means operatively interposed between the lower level detector means and the output channel means.

WILLIAM R. BLISS.

REFERENCES CITED

The following references are of record in the file of this patent:

UNITED STATES PATENTS

| Number | Name | Date |
|---|---|---|
| 1,477,017 | Sprague | Dec. 11, 1923 |
| 1,711,658 | Sprague | May 7, 1929 |
| 1,808,915 | Bjornson | June 9, 1931 |
| 2,014,509 | Roosenstein et al. | Sept. 17, 1935 |
| 2,031,072 | Roosenstein | Feb. 18, 1936 |
| 2,269,011 | Dallos | Jan. 6, 1942 |